(No Model.)
T. P. SULLIVAN.
LIQUID LEVEL INDICATOR.
No. 421,061. Patented Feb. 11, 1890.
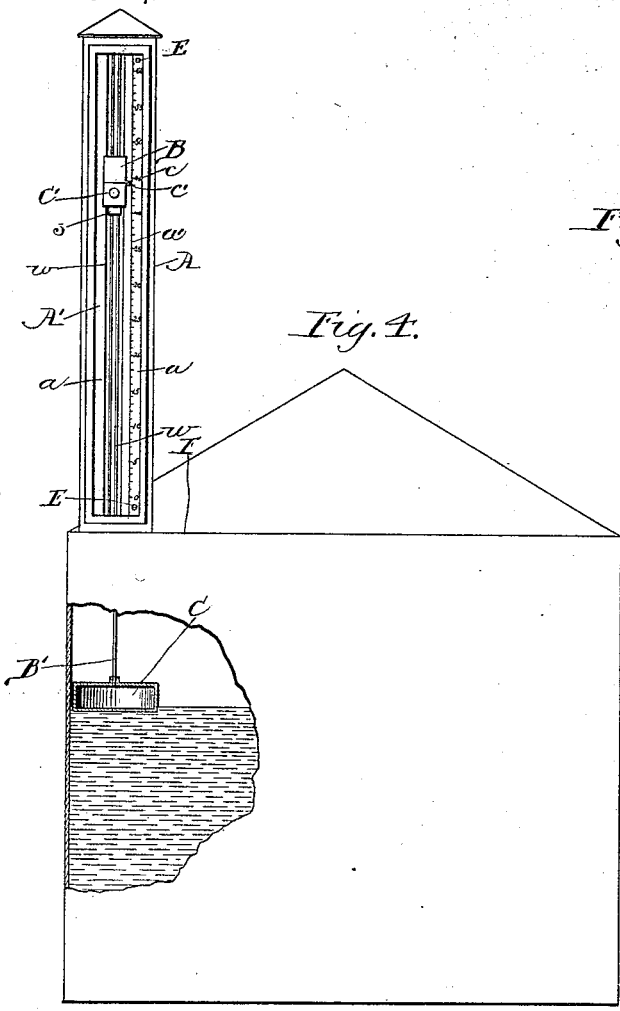
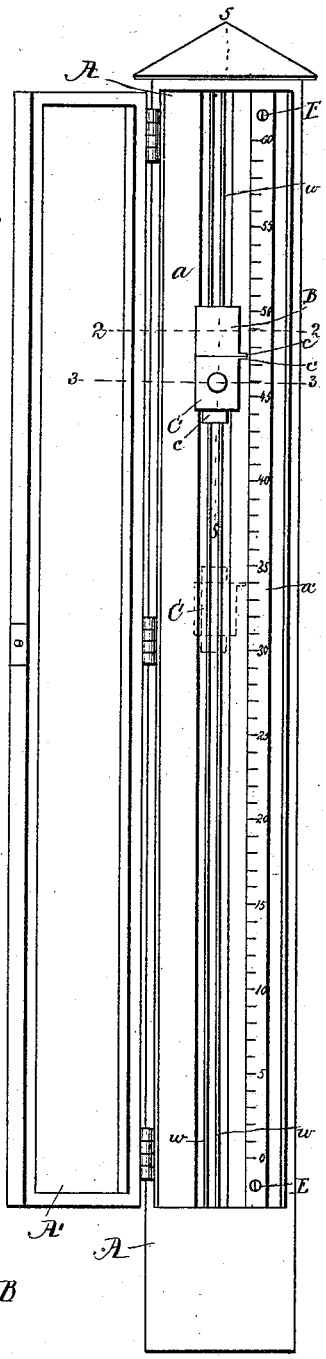
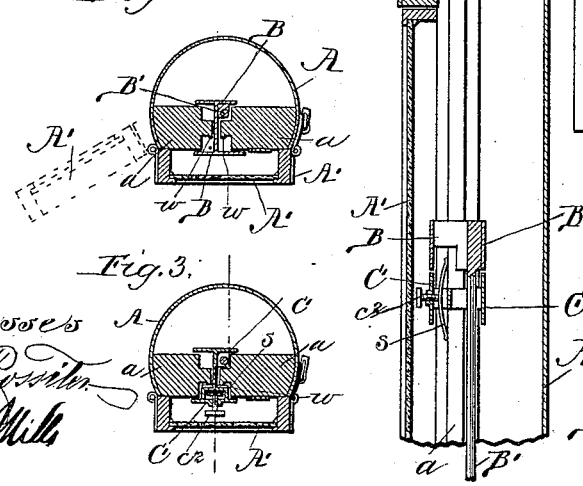

UNITED STATES PATENT OFFICE.

THOMAS P. SULLIVAN, OF CHICAGO, ILLINOIS.

LIQUID-LEVEL INDICATOR.

SPECIFICATION forming part of Letters Patent No. 421,061, dated February 11, 1890.

Application filed December 17, 1889. Serial No. 334,032. (No model.)

*To all whom it may concern:*

Be it known that I, THOMAS P. SULLIVAN, of Chicago, in the State of Illinois, have invented certain new and useful Improvements in Apparatus for Measuring Liquids for Charging Tanks, of which the following is a specification.

My invention relates to an apparatus for automatically determining the amount of oil poured into a tank for filling or refilling when either wholly or partially emptied.

It is customary among dealers in selling kerosene to keep a supply with the retailers in tanks, which are filled at intervals from a large portable tank hauled around, from which the oil is measured out and poured into the retail-tanks to keep up the supply; and it is the object of my invention to provide an apparatus to be attached to the retail-tanks for the purpose of indicating automatically the amount of oil poured into the tank at any time irrespective of any quantity less than a tank full which may be in the tank before the pouring in is commenced. This object I have attained by the apparatus constructed as illustrated in the accompanying drawings, in which—

Figure 1 is a front elevation of the apparatus open. Fig. 2 is a horizontal section on the line 2 2 of Fig. 1. Fig. 3 is a like section on the line 3 3 of Fig. 1, the door being closed. Fig. 4 is a side elevation showing the application of the apparatus to a tank. Fig. 5 is a vertical section on line 5 5 of Fig. 1, and shows some of the details of construction.

In the drawings, A designates a tube made of sheet metal, and provided at one side with a glass door A'. Within the tube and at the side next to the door there is a way composed of strips $a$, which are secured to the interior of the tube. Upon the face of one of these strips there is attached a graduated scale $a'$, made with reference to the uniform diameter of the tank, and graduated in such manner as to indicate gallons or fractions thereof by reference to the rise and fall of oil therein. There is a slide B upon said way, which is connected to a rod B', having connection with a float C on the top of the oil in such manner as to raise and lower the slide on the way as the surface of the oil rises and falls in the tank. A finger or pointer $c$ on the slide points to the graduations of the scale to indicate the amount of oil in the tank. Below the slide B there is another slide C', also having a finger or pointer $c'$, which, when said two slides are brought together, indicates or registers with the same point as the finger $c$. The latter slide is not attached rigidly to the rod B', but has an opening through which said rod can pass without actuating it, and it is connected with the way so as to slide or remain at rest thereon at any point at which it may be set. A spring $s$ is interposed between said slide C' and the way, being connected loosely with the slide and resting on a track of wires $w$, attached to the way to provide a smooth even bearing for said spring to slide upon, and a set-screw $c^2$ is arranged to bear upon the spring, whereby the friction of said slide upon the way may be adjusted so as to hold it at any point where it may be left, and yet permit it to be moved by slight force, so that the fall of the slide B will carry it down also.

When oil is poured into the tank, the float is thereby raised, and through the instrumentality of the rod B' will raise the slide B, but leave the slide C' to indicate the lowest point to which the oil has been previously drawn off, so that the amount poured in can be read from the scale.

In use the door A' is secured by lock and key under the control of the retailer, who need not give attention to the replenishing of his tank, because he can tell, by inspecting the indicator at any time thereafter before drawing oil, just how much has been put in. Before drawing oil again the slide C' should be raised up to the slide B, which is done by sliding it up with the hand.

There are three sizes of tanks in use, and I have adapted scales to them and made them detachable by screws E, for conveniently adapting any of the apparatuses to the different sizes of tanks.

The apparatus may be attached to the tank by making a hole through the tank lid or top F sufficient for the rod to play in, and soldering the bottom of the tube over such hole.

Having thus described my invention, what I claim is—

1. The tube A, having the door A', in combination with the way $a$, provided with a graduated scale, slide B, rod B', float C, and separate slide C', substantially as and for the purpose specified.

2. In an apparatus substantially such as shown and described, and in combination, the way a, provided with a graduated scale, a slide B, and rod B', connected with a float for operating said slide, and a separate slide C', adjustably secured to said way, so as to be easily movable and remain set at any point thereon, as specified.

THOMAS P. SULLIVAN.

Witnesses:
 JAMES SULLIVAN,
 WM. R. GRISWOLD, Jr.